US012688001B2

(12) United States Patent
L et al.

(10) Patent No.: US 12,688,001 B2
(45) Date of Patent: Jul. 21, 2026

(54) SMART AUDIO SYSTEM FOR USE WITH AN INFORMATION HANDLING SYSTEM AUDIO SYSTEM

(71) Applicant: Dell Products L.P., Round Rock, TX (US)

(72) Inventors: Akash L, Bangalore (IN); Karthik Venkatesh, Bangalore (IN); Sankeerna S, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 308 days.

(21) Appl. No.: 18/637,507

(22) Filed: Apr. 17, 2024

(65) Prior Publication Data

US 2025/0328306 A1 Oct. 23, 2025

(51) Int. Cl.
*H04R 29/00* (2006.01)
*G06F 3/16* (2006.01)

(52) U.S. Cl.
CPC ........... *G06F 3/162* (2013.01); *H04R 29/002* (2013.01); *H04R 2420/07* (2013.01)

(58) Field of Classification Search
CPC .... G06F 3/162; H04R 29/002; H04R 2420/07
See application file for complete search history.

(56) References Cited

U.S. PATENT DOCUMENTS

| | | | | |
|---|---|---|---|---|
| 2019/0179605 A1* | 6/2019 | Stefan | ...................... | G06F 3/165 |
| 2020/0288257 A1* | 9/2020 | Vautrin | ................... | G06F 3/162 |
| 2022/0303707 A1* | 9/2022 | Jung | ........................ | H04S 7/301 |
| 2022/0413792 A1* | 12/2022 | Iyer | ..................... | G06F 11/3041 |
| 2023/0353668 A1* | 11/2023 | Goh | ..................... | H04M 1/6041 |
| 2024/0196130 A1* | 6/2024 | Agrawal | ................. | H04S 7/301 |

OTHER PUBLICATIONS

Angela Hsiao, How we're helping you switch audio between devices, Google, The Keyword, Andoid, Jul. 21, 2022.

* cited by examiner

*Primary Examiner* — David L Ton
(74) *Attorney, Agent, or Firm* — Terrile, Cannatti & Chambers, LLP; Stephen A. Terrile

(57) ABSTRACT

A system, method, and computer-readable medium for performing a smart audio operation. The smart audio operation includes detecting a plurality of audio devices available for use by an information handling system; monitoring information handling system audio related information; analyzing the information handling system audio related information using a trained smart audio artificial intelligence model; and, automatically connecting the information handling system to a particular audio device of the plurality of audio devices based upon the information handling system audio related information.

20 Claims, 11 Drawing Sheets

300

Device is idle form more than 5 minutes. Swtiching to Realtek speaker. Press volume button to keep using JBL headphone 520a Connected audio device is JBL Bluetooth Battery Level: 75%

520b

510

500

SMART AUDIO SYSTEM FOR USE WITH AN INFORMATION HANDLING SYSTEM AUDIO SYSTEM

BACKGROUND OF THE INVENTION

Field of the Invention

The present invention relates to information handling systems. More specifically, embodiments of the invention relate to information handling system audio systems and more particularly to a smart audio switching system for use with information handling system audio systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment the invention relates to a method for performing a smart audio operation comprising: detecting a plurality of audio devices available for use by an information handling system; monitoring information handling system audio related information; analyzing the information handling system audio related information using a trained smart audio artificial intelligence model; and, automatically connecting the information handling system to a particular audio device of the plurality of audio devices based upon the information handling system audio related information.

In another embodiment the invention relates to a system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: detecting a plurality of audio devices available for use by an information handling system; monitoring information handling system audio related information; analyzing the information handling system audio related information using a trained smart audio artificial intelligence model; and, automatically connecting the information handling system to a particular audio device of the plurality of audio devices based upon the information handling system audio related information.

In another embodiment the invention relates to a computer-readable storage medium embodying computer program code, the computer program code comprising computer executable instructions configured for: detecting a plurality of audio devices available for use by an information handling system; monitoring information handling system audio related information; analyzing the information handling system audio related information using a trained smart audio artificial intelligence model; and, automatically connecting the information handling system to a particular audio device of the plurality of audio devices based upon the information handling system audio related information.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
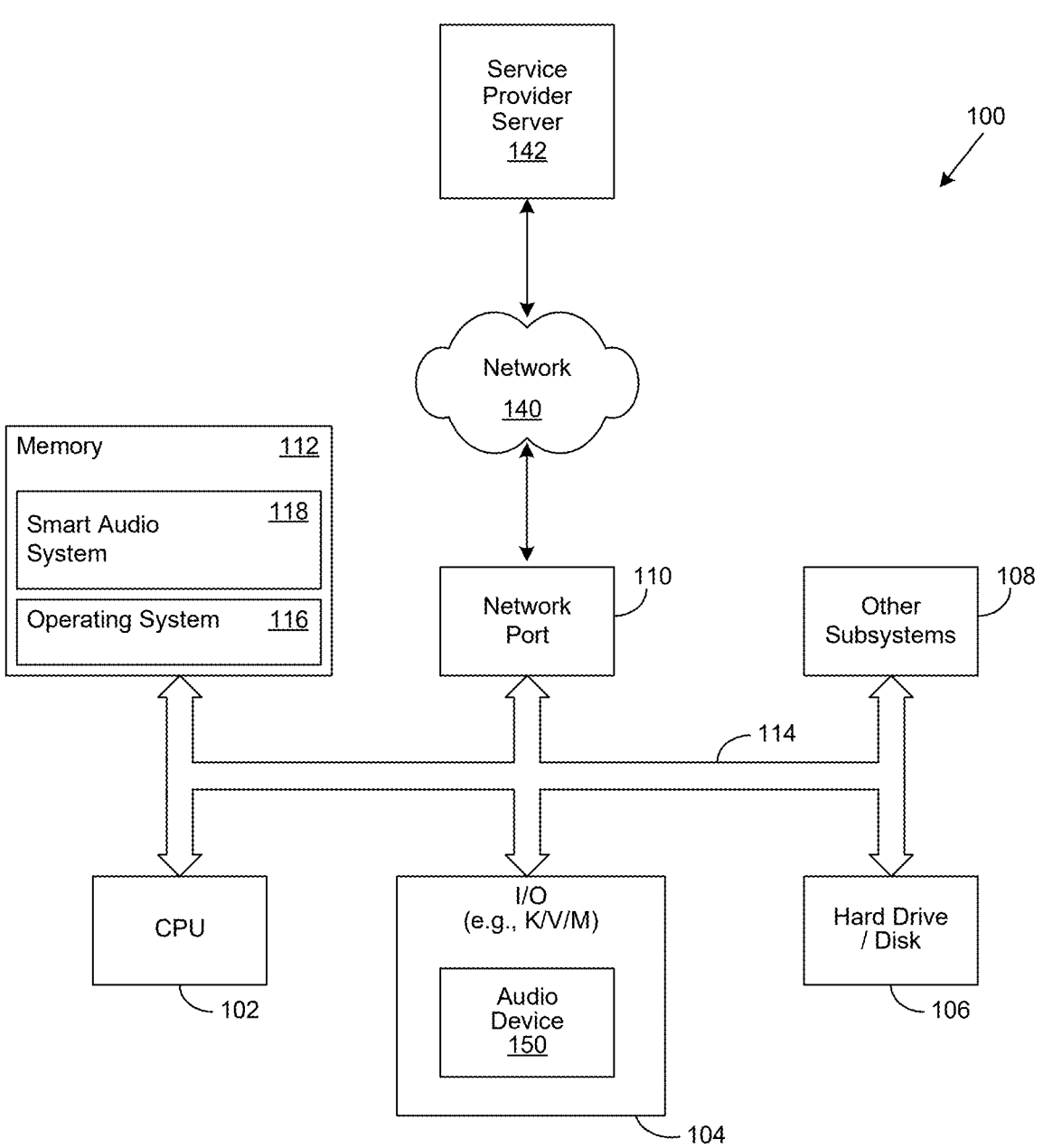
FIG. 1 shows a general illustration of components of an information handling system as implemented in the system and method of the present invention.

A system, method, and computer-readable medium are disclosed for performing an information handling system smart audio system operation.

Certain aspects of the invention reflect an appreciation that it can be challenging for information handling systems, such as laptop type information handling systems to establish connections with more than one audio device. Certain aspects of the invention reflect an appreciation that establishing connections with more than one audio device can often require intricate synchronization operations. Certain aspects of the invention reflect an appreciation that this issue can become particularly pronounced during transitions between audio devices for collaborative meetings.

Certain aspects of the invention reflect an appreciation that it would be desirable to provide an automated solution that can seamlessly manage audio device transitions. Certain aspects of the invention reflect an appreciation that it would be desirable to provide an artificial intelligence model which is capable of discerning user preferences when managing audio device transitions.

Certain aspects of the invention reflect an appreciation that with many information handling system communication systems, audio devices such as Bluetooth audio devices can present a plurality of technical challenges. Certain aspects of the invention reflect an appreciation that these technical challenges can include a risk of missing important notifications during idle periods when the Bluetooth headset is connected but not in use, as well as a requirement for manual audio device switching in collaborative meetings which can disrupt meeting flow. Certain aspects of the invention reflect an appreciation that audio device switching may be necessary due to certain audio devices having low battery condition. Certain aspects of the invention reflect an appreciation that requirements associated with audio device switching can disrupt meeting flow.

A system, method, and computer-readable medium are disclosed for performing a smart audio system operation. In certain embodiments, the smart audio system operation is performed by a smart audio system. In certain embodiments, the smart audio system includes an artificial intelligence model which is implemented to detect idle times and automatically switch audio output between audio devices. In certain embodiments, the audio output is switched to built-in speakers when notifications arrive, preventing notification oversight. In certain embodiments, the smart audio system automatically detects audio device battery levels. In certain embodiments, the smart audio system detects battery levels of all devices associated with during collaborative meetings. In certain embodiments, the audio devices include one or more Bluetooth type audio devices. In certain embodiments, the smart audio system detects battery levels of the one or more Bluetooth type audio devices. In certain embodiments, the smart audio system generates transition prompts for users. In certain embodiments, the transition prompts include specific patterns of actions required to switch audio devices. In certain embodiments, the specific patterns of action include Bluetooth button actuations, device actuations, or a combination thereof. Such a smart audio system provides a seamless, hands-free and streamlined method to resolve audio device issues and to enhance communication system efficiency.

In certain embodiments, the artificial intelligence model streamlines audio system work processes. In certain embodiments, the artificial intelligence model considers user-specific requirements such as notification preferences. In certain embodiments, the smart audio system facilitates automatic switching to alternative audio devices.

Such a smart audio system operation provides a seamless audio switching function. In certain embodiments, the seamless audio switching enables uninterrupted audio transitions across a diverse array of interconnected audio devices. In certain embodiments, the smart audio system provides a seamless audio transition experience, which can be especially useful in collaborative environments.

In certain embodiments, the smart audio system includes one or more microservices. In certain embodiments, the microservices seamlessly communicate with the operating system of the information handling system. In certain embodiments, the microservices capture information associated with audio system relevant events. In certain embodiments, the microservices automatically respond to the audio system relevant events. In certain embodiments, the responses are based on user inputs.

In certain embodiments, the artificial intelligence model performs a contextual awareness operation. In certain embodiments, the contextual awareness operation analyzes one or more contextual factors, such as the user's location, activity, and preferences, to determine an appropriate audio device for a particular situation. In certain embodiments, the contextual awareness operation considers a user's specific needs and environment.

In certain embodiments, the artificial intelligence model performs a dynamic device selection operation. In certain embodiments, the dynamic device selection operation dynamically selects an optimal audio device based on real-time conditions. For example, if the user is moving away from a Bluetooth speaker and entering an area with a better Wi-Fi connection, the dynamic device selection operation intelligently switches the audio output of the information handling system from the Bluetooth speaker to a Wi-Fi-enabled audio device without any manual intervention.

In certain embodiments, the artificial intelligence model performs an intelligent audio routing operation. In certain embodiments, the intelligent audio routing operation intelligently routes audio signals based on the user's preferences and device capabilities. In certain embodiments, the intelligent audio routing operation adaptively adjusts the audio output to different devices, ensuring compatibility and optimizing audio quality based on the specific characteristics of each device.

In certain embodiments, the artificial intelligence model performs a multi-device synchronization operation. In certain embodiments, the multi-device synchronization operation synchronizes audio playback across a plurality of audio devices to create a seamless audio experience. For example, if the user wants to extend the audio playback to multiple speakers in different rooms, the multi-device synchronization operation synchronizes the audio stream across those devices, ensuring that the audio playback is coordinated and without any noticeable delays.

In certain embodiments, the artificial intelligence model performs an automatic device detection operation. In certain embodiments, the automatic device detection operation automatically detects newly connected audio devices and configures the detected devices for seamless audio transitions. In certain embodiments, the automatic device detection operation identifies the device type, capabilities, and settings required to optimize audio playback on a particular audio device, thus reducing the need for manual device setup and configuration.

In certain embodiments, the artificial intelligence model performs an adaptive audio processing operation. In certain embodiments, the adaptive audio processing operation adaptively processes audio signals to match the characteristics of a plurality of audio devices. In certain embodiments, the adaptive audio processing includes adjusting equalization settings, volume levels, and audio formats to ensure consistent audio output quality across a plurality of audio devices, regardless of their individual characteristics.

In certain embodiments, the smart audio system identifies specific individual user-specific requirements. In certain embodiments, the smart audio system incorporates personalization and adaptability based upon specific individual user-specific requirements.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, a touchpad or touchscreen, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise smart audio system 118. In one embodiment, the information handling system 100 is able to download the smart audio system 118 from the service provider server 142. In another embodiment, the smart audio system 118 is provided as a service from the service provider server 142. In certain embodiments, the I/O devices 104 may include one or more audio devices 150. In certain embodiments, the one or more audio devices 150 can include integrated speakers, Bluetooth connected external speakers, WiFi connected external speakers, other sound producing devices, or a combination thereof.

The smart audio system 118 performs a smart audio system operation. In certain embodiments, the smart audio system includes an artificial intelligence model which is implemented to detect idle times and automatically switch audio output between audio devices. In certain embodiments, the audio output is switched to built-in speakers when notifications arrive, preventing notification oversight. In certain embodiments, the smart audio system automatically detects audio device battery levels. In certain embodiments, the smart audio system detects battery levels of all devices associated with during collaborative meetings. In certain embodiments, the audio devices include one or more Bluetooth type audio devices. In certain embodiments, the smart audio system detects battery levels of the one or more Bluetooth type audio devices. In certain embodiments, the smart audio system generates transition prompts for users. In certain embodiments, the transition prompts include specific patterns of actions required to switch audio devices. In certain embodiments, the specific patterns of actions include Bluetooth button actuations, device actuations, or a combination thereof. Such a smart audio system provides a seamless, hands-free and streamlined method to resolve audio device issues and to enhance communication system efficiency.

In certain embodiments, the artificial intelligence model streamlines audio system work processes. In certain embodiments, the artificial intelligence model considers user-specific requirements such as notification preferences. In certain embodiments, the smart audio system facilitates automatic switching to alternative audio devices.

Such a smart audio system operation provides a seamless audio switching function. In certain embodiments, the seamless audio switching enables uninterrupted audio transitions across a diverse array of interconnected audio devices. In certain embodiments, the smart audio system provides a seamless audio transition experience, which can be especially useful in collaborative environments.

In certain embodiments, the smart audio system includes one or more microservices. In certain embodiment, the microservices seamlessly communicate with the operating system of the information handling system. In certain embodiments, the microservices capture information associated with audio system relevant events. In certain embodiments, the microservices automatically respond to the audio system relevant events. In certain embodiments, the responses are based on user inputs.

In certain embodiments, the artificial intelligence model performs a contextual awareness operation. In certain embodiments, the contextual awareness operation analyzes one or more contextual factors, such as the user's location, activity, and preferences, to determine an appropriate audio device for a particular situation. In certain embodiments, the contextual awareness operation considers a user's specific needs and environment.

In certain embodiments, the artificial intelligence model performs a dynamic device selection operation. In certain embodiments, the dynamic device selection operation dynamically selects an optimal audio device based on real-time conditions. For example, if the user is moving away from a Bluetooth speaker and entering an area with a better Wi-Fi connection, the dynamic device selection operation intelligently switches the audio output of the information handling system from the Bluetooth speaker to a Wi-Fi-enabled audio device without any manual intervention.

In certain embodiments, the artificial intelligence model performs an intelligent audio routing operation. In certain embodiments, the intelligent audio routing operation intelligently routes audio signals based on the user's preferences and device capabilities. In certain embodiments, the intelligent audio routing operation adaptively adjusts the audio output to different devices, ensuring compatibility and optimizing audio quality based on the specific characteristics of each device.

In certain embodiments, the artificial intelligence model performs a multi-device synchronization operation. In certain embodiments, the multi-device synchronization operation synchronizes audio playback across a plurality of audio devices to create a seamless audio experience. For example, if the user wants to extend the audio playback to multiple speakers in different rooms, the multi-device synchronization operation synchronizes the audio stream across those devices, ensuring that the audio playback is coordinated and without any noticeable delays.

In certain embodiments, the artificial intelligence model performs an automatic device detection operation. In certain embodiments, the automatic device detection operation automatically detects newly connected audio devices and configures the detected devices for seamless audio transitions. In certain embodiments, the automatic device detection operation identifies the device type, capabilities, and settings required to optimize audio playback on a particular audio device, thus reducing the need for manual device setup and configuration.

In certain embodiments, the artificial intelligence model performs an adaptive audio processing operation. In certain embodiments, the adaptive audio processing operation adaptively processes audio signals to match the characteristics of a plurality of audio devices. In certain embodiments, the adaptive audio processing includes adjusting equalization settings, volume levels, and audio formats to ensure consistent audio output quality across a plurality of audio devices, regardless of their individual characteristics.

In certain embodiments, the smart audio system identifies specific individual user-specific requirements. In certain embodiments, the smart audio system incorporates personalization and adaptability based upon specific individual user-specific requirements.

Figure 2:
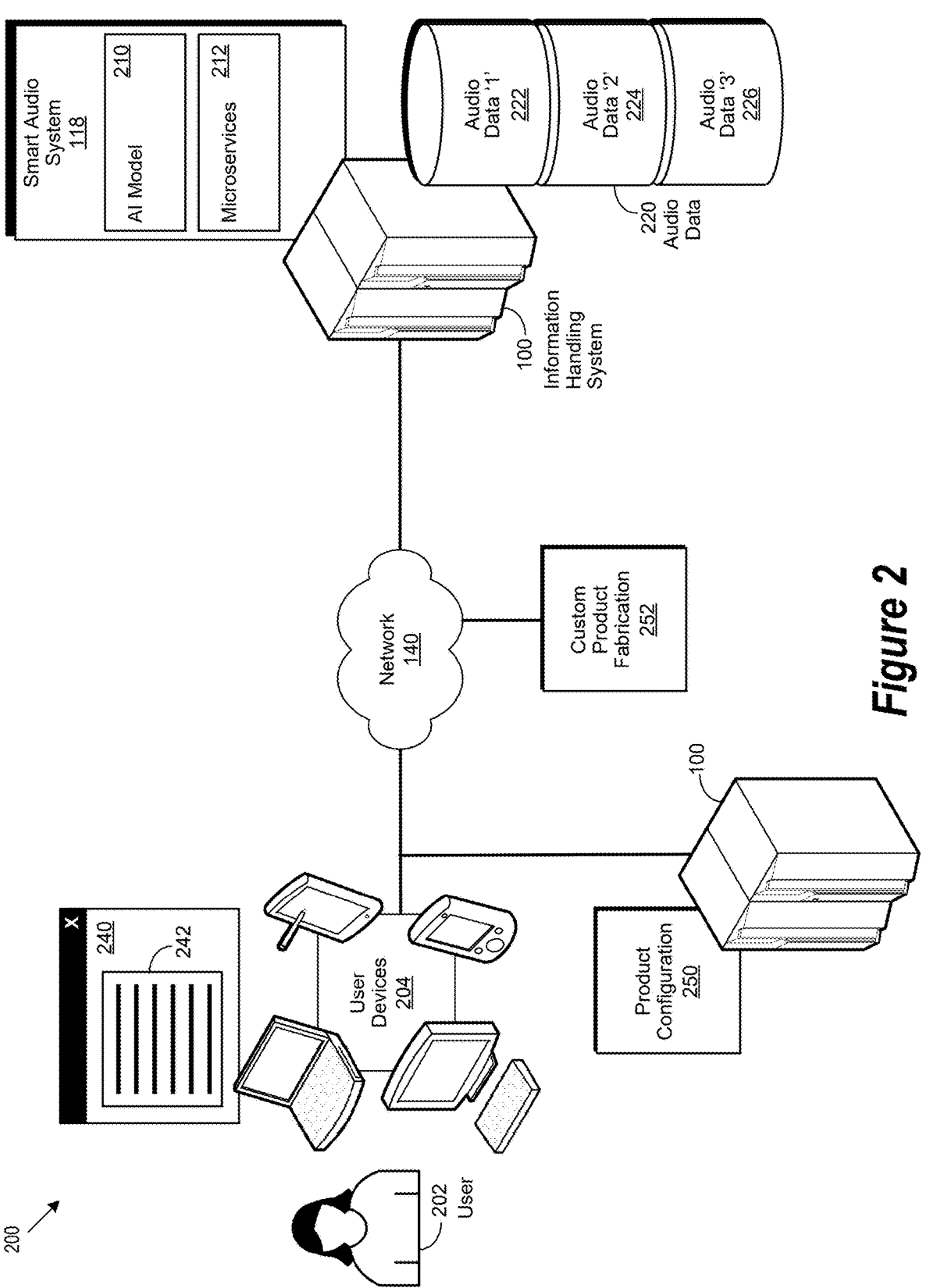
FIG. 2 shows a block diagram of a customer service interaction estimation environment.

FIG. 2 is a block diagram of a smart audio system environment 200 implemented in accordance with an embodiment of the invention. In certain embodiments, the smart audio system environment 200 may include a smart audio system 118. In certain embodiments, the smart audio system environment 200 may include a repository of smart audio system data 220. In certain embodiments, the repository of smart audio system data 220 may be local to the system executing the smart audio system 118 or may be executed remotely. In certain embodiments, the repository of audio data 220 may include various information associated with audio data '1' 222, audio data '2' 224, and audio data '3' 226.

In certain embodiments, the smart audio system 118 may include an artificial intelligence model 210, a microservice module 212, or a combination thereof. In certain embodiments, the artificial intelligence model 210 may be implemented to perform a smart audio artificial intelligence operation. In certain embodiments, the microservice module 212 may be implemented to perform one or more smart audio microservice operations.

In certain embodiments, a user 202 may use a user device 204 to interact with the smart audio system 118. In certain embodiments, the smart audio system 118 may be implemented on the user device 204. As used herein, a user device 204 refers to an information handling system such as a personal computer, a laptop computer, a tablet computer, a personal digital assistant (PDA), a smart phone, a mobile telephone, or other device that is capable of communicating and processing data. In certain embodiments, the user device 204 may be configured to present a smart audio system user interface (UI) 240. In certain embodiments, the smart audio system UI 240 may be implemented to present a graphical representation 242 of smart audio system information, which is automatically generated in response to interaction with the smart audio system 118.

In certain embodiments, the user device 204 is used to exchange information between the user 202 and the smart audio system 118, a product configuration system 250, and a custom product fabrication system 252, through the use of a network 140. In certain embodiments, the network 140 may be a public network, such as a public internet protocol (IP) network, a physical private network, a wireless network, a virtual private network (VPN), or any combination thereof. Skilled practitioners of the art will recognize that many such embodiments are possible and the foregoing is not intended to limit the spirit, scope or intent of the invention.

In various embodiments, the smart audio system UI 240 may be presented via a website. In certain embodiments, the website may be provided by one or more of the smart audio system 118 and the product configuration system 250. For the purposes of this disclosure, a website may be defined as a collection of related web pages which are identified with a common domain name and is published on at least one web server. A website may be accessible via a public IP network or a private local network.

A web page is a document which is accessible via a browser which displays the web page via a display device of an information handling system. In various embodiments, the web page also includes the file which causes the document to be presented via the browser. In various embodiments, the web page may comprise a static web page, which is delivered exactly as stored and a dynamic web page, which is generated by a web application that is driven by software that enhances the web page via user input to a web server.

In certain embodiments, the smart audio system 118 may be implemented to interact with the product configuration system 250, which in turn may be executing on a separate information handling system 100. In various embodiments, the product configuration system 250 interacts with a custom product fabrication system 252. In various embodiments, the product configuration system 250 may be used to configure products which may include a smart audio system, which in turn may be associated with the custom product fabrication system 252 and the products it may fabricate. In certain embodiments, the smart audio system 118 may be implemented to perform a smart audio function, as described in greater detail herein.

Figure 3:
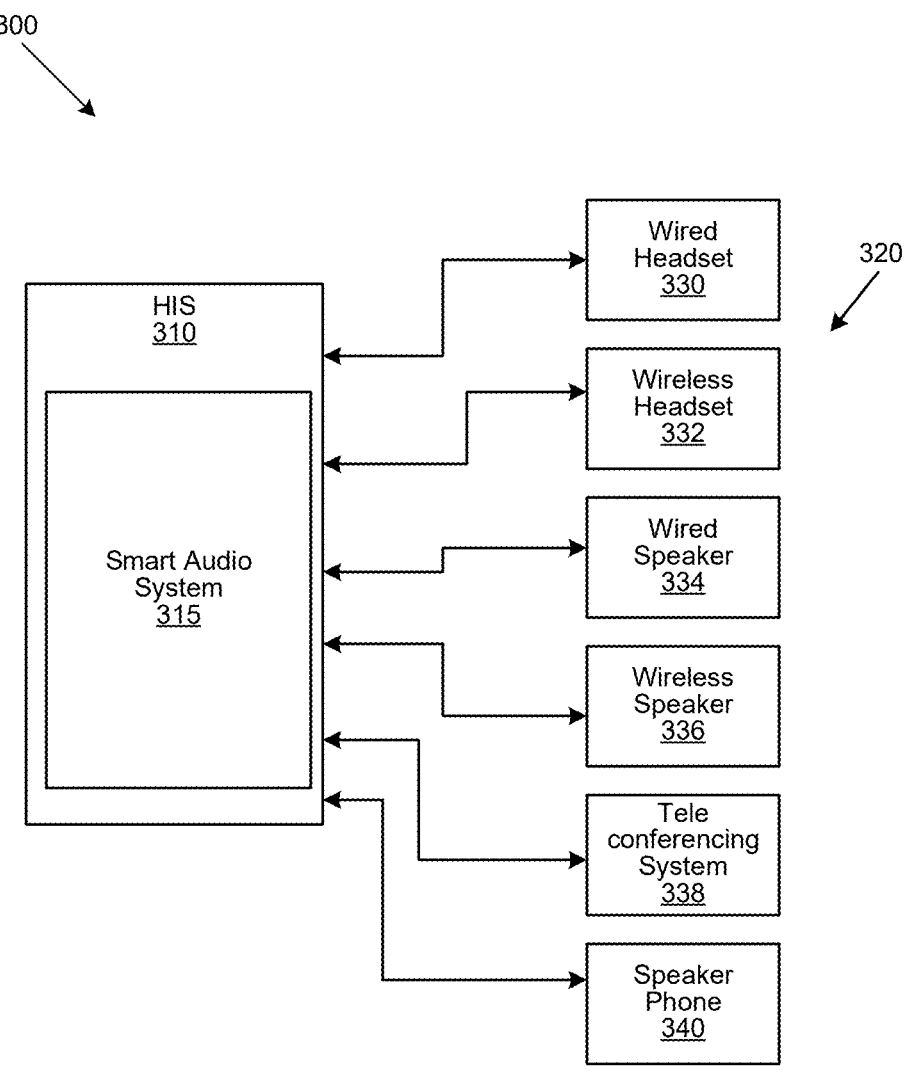
FIG. 3 shows a functional block diagram of an information handling system smart audio system environment.

FIG. 3 shows a functional block diagram of an information handling system smart audio system environment 300. More specifically, the information handling system smart audio system environment 300 includes an information handling system 310 and a plurality of audio devices 320. In certain embodiments, the information handling system 310 includes a smart audio system 315. In certain embodiments, the information handling system 310 corresponds to information handling system 100. In certain embodiments, the smart audio system 315 corresponds to smart audio system 118. In certain embodiments, the plurality of audio devices includes one or more of wired headset 330, a wireless headset 332, a wired speaker 334, a wireless speaker 336, a teleconferencing system 338, a speaker type telephone 340, or a combination thereof.

In certain embodiments, one or more of the wired devices communicate with the information handling system via a speaker type connection, a universal serial bus (USB) type connection, an audio line level device connection (e.g., a 3.5 mm audio cable), or a combination thereof. In certain embodiments, one or more of the wireless devices communicate with the information handling system 310 via a Bluetooth connection, a WiFi connection, or a combination thereof.

In certain embodiments, the smart audio system 315 detects audio change events associated with one or more audio devices 320 through a predefined smart audio system microservice. In certain embodiments, the smart audio system 315 provides a seamless transition between audio devices 320 without a need to access information handling system or Bluetooth settings or to navigate within collaborative application settings.

In the context of a collaborative meeting on platforms such as the meeting platform available under the trade designation Microsoft Teams or the meeting platform available under the trade designation Zoom, users initiate an audio device transition by simply actuating a designated "wake-up" button on a connected headset or audio device. In certain embodiments, a specific pattern for a wake-up activation can be customized, for instance, a rapid double-click of the volume up button without interruption. In certain embodiments, the smart audio microservice identifies the actuation as an input originating from the audio device and facilitates control of the audio device accordingly.

In certain embodiments, upon activation, a smart audio user interface appears on the information handling system, displaying the available audio devices connected to the information handling system and the collaborative meeting. Users can navigate through smart audio options using the buttons on their audio device as suggested in the smart audio user interface. Once a selection is made or an option is hovered over, the new audio device is seamlessly activated. The smart audio system operation automatically switches to an alternative audio device without any need for physical interaction with the information handling system, streamlining the user experience in collaborative settings.

In certain embodiments, the smart audio system enables a user to configure hotkeys or shortcuts to quickly switch between audio devices. For example, a simple key combination in or from the Bluetooth device can toggle between the connected Bluetooth headset and an internal speaker of the information handling system.

Such a smart audio system advantageously provides an enhanced user experience. For example, the smart audio system ensures a seamless audio switching experience, eliminating the need for manual adjustments, and providing users with a smooth and uninterrupted audio experience. Such a smart audio system advantageously facilitates multi-device connectivity. In operation, the smart audio system unlocks the power of connecting multiple audio devices to an information handling system and seamlessly switches between the plurality of audio devices on the fly. Accordingly, a user can easily toggle between speakers, headphones, and more. Such a smart audio system provides intuitive pattern-based control. The smart audio system allows initiating audio device switching by using custom patterns, thereby making the process more intuitive and hands-free. Such a smart audio system allows seamless multi-device integration. Unlike many existing solutions that handle only device-to-device switching, the smart audio system seamlessly integrates a plurality of audio devices, allowing users to switch between them effortlessly without needing to access information handling system or Bluetooth settings. Such an audio system advantageously supports real time audio quality management. The smart audio system addresses the important issue of maintaining audio quality during audio device switching. It employs real-time audio buffering and codec optimization to ensure a smooth transition with minimal audio disruptions.

In certain embodiments, the smart audio system manages multiple audio output devices efficiently to avoid missing notifications. In certain embodiments, the smart audio system microservice detects whether a user is wearing or not wearing a headset. If the user is not wearing the headset, the smart audio system automatically switches the audio output to the information handling system speaker, thus ensuring that a notification to the user is not missed. In certain embodiments, the smart audio system microservice provides a solution that learns usage patterns and context of a user. In certain embodiments, the smart audio system microservice detects when a user is attending a meeting and switches to a headset automatically, or when not in meetings, keeps audio on the information handling system speaker.

In certain embodiments, the smart audio system characterizes the available audio devices and identifies a best audio device based upon a usage mode. For instance, during a meeting, factors like audio quality, network reliability, and battery status are given higher priority over active participation factors. Conversely, when enjoying media, sound quality can be prioritized over other factors.

In certain embodiments, the smart audio system monitors audio device battery levels. When the current connected Bluetooth device signals a low battery notification or before engaging in specific activities such as attending a meeting, listening to music, or watching a movie, the smart audio system can discern a most suitable connected device based on the task at hand.

In certain embodiments, the smart audio system considers user preferences, user behavior, network bandwidth, and audio device proximity, to seamlessly switch between audio devices as needed. In certain embodiments, the smart audio system leverages information from a user's calendar invites to proactively assess upcoming events and recommend a most suitable audio device. If, for example, a current device has a low battery that can only sustain 30 minutes of operation while the meeting duration is more than that (e.g., 1 hour), the smart audio system intelligently refrains from suggesting the device with the lower battery capacity. Instead, the smart audio system could recommend charging the device if necessary, ensuring that the user is well-equipped with a reliable device for the entire duration of the scheduled meeting. Such an approach optimizes the user experience by preemptively addressing potential issues related to device battery life.

In certain embodiments, the smart audio system facilitates use of remote work environments, such as online meetings and calls. In certain embodiments, the smart audio system enhances user comfort and reliability as well as providing audio device customization and personalization. Accordingly, the smart audio system is particularly valuable in situations where users can focus on their tasks without having to constantly attend to individual settings.

Figure 4:
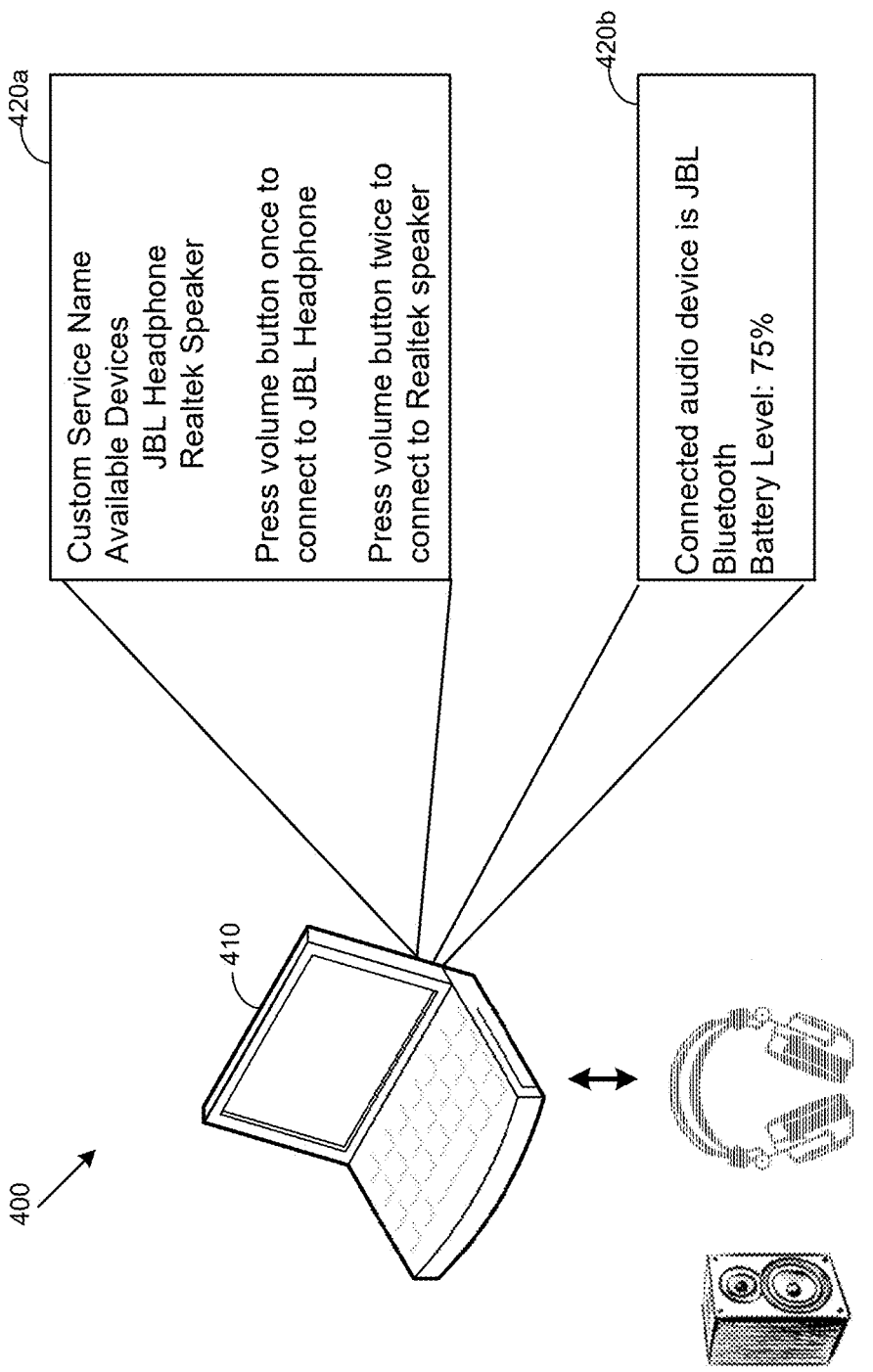
FIG. 4 shows a functional block diagram of a smart audio system use scenario.

FIG. 4 shows a functional block diagram of a smart audio system use scenario 400. More specifically, in the smart audio system use scenario 400, the smart audio system detects all devices that can be connected to the information handling system 410 and provides an option to a user to switch among the audio devices via a smart audio system user interface 420a. In certain embodiments, when a smart audio system user interface 420 is active (e.g., is presented on a display device of the information handling system), a hotkey (e.g., a volume button) on one or more of the audio devices is configured to provide a smart audio hotkey function. In certain embodiments, when a smart audio system user interface 420 is not active (e.g., is not presented on a display device of the information handling system), the hotkey on one or more of the audio devices reverts to be configured to function with their original functionality (e.g., as an audio device volume control).

Once an audio device is selected, the smart audio system generates a notification regarding the audio device selection. In certain embodiments, the smart audio system obtains battery information from the selected audio device. In certain embodiments, the battery information of the selected audio device is presented via the smart audio system user interface 420b.

Figure 5:
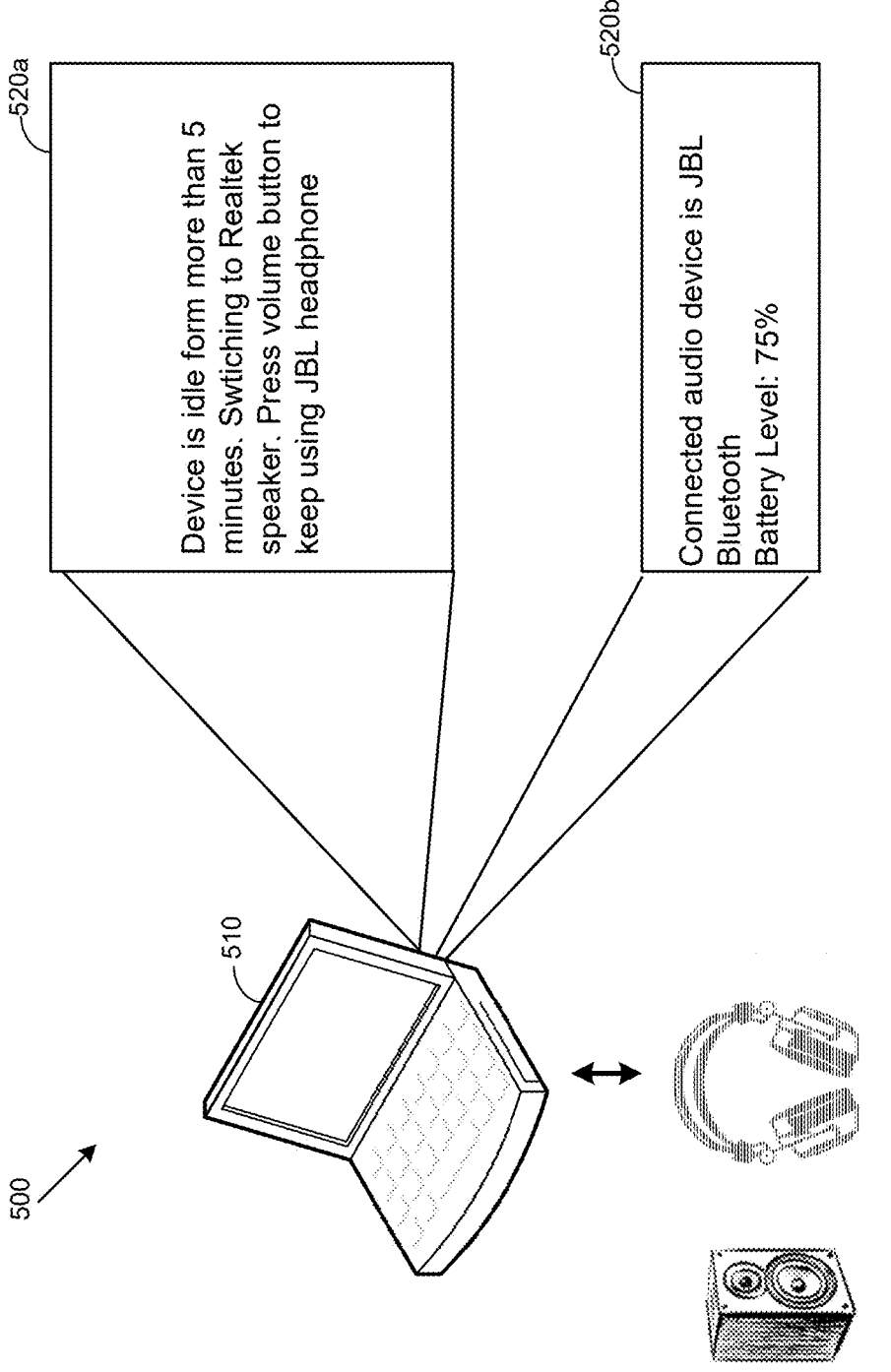
FIG. 5 shows a functional block diagram of another smart audio system use scenario.

FIG. 5 shows a functional block diagram of another smart audio system use scenario 500. More specifically, in the smart audio system use scenario 500, the smart audio system provides a seamless transition to a default speaker based upon idle time detection. More specifically, the smart audio system of the information handling system 510 monitors idle time of a connected audio device 512. When the smart audio system determines that an idle time of the connected audio device 512 exceeds a particular threshold, the smart audio system notifies a user to switch away from the audio device.

In certain embodiments, a smart audio system user interface 520*a* provides the notification to the user. In certain embodiments, the notification includes an instruction regarding how to maintain the connected audio device 512 as active. In certain embodiments, a hotkey may be used to maintain the connected audio device as active. In certain embodiments, the smart audio system obtains battery information from the selected audio device. In certain embodiments, the battery information of the selected audio device is presented via the smart audio system user interface 520*b*.

Figure 6:
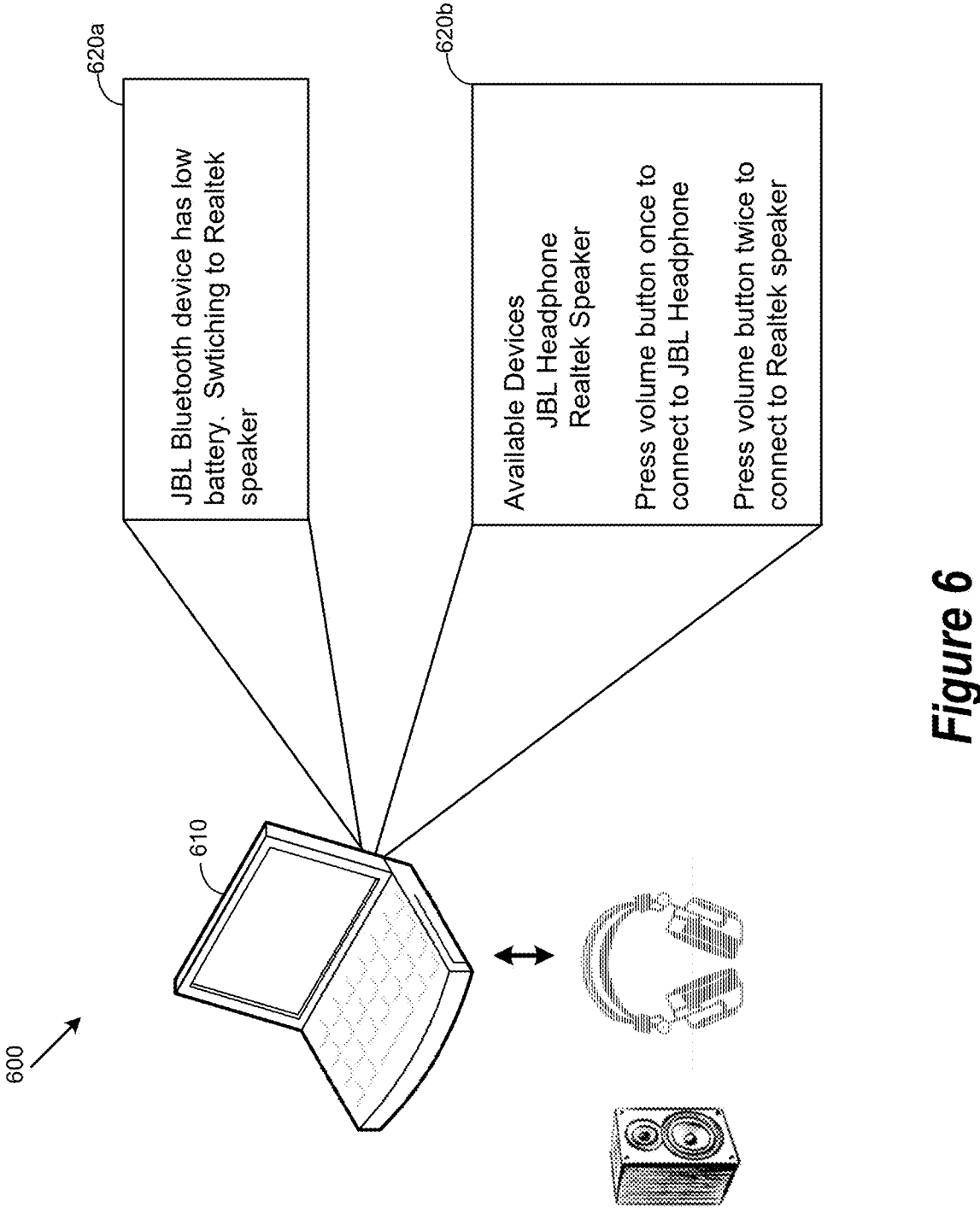
FIG. 6 shows a functional block diagram of another smart audio system use scenario.

FIG. 6 shows a functional block diagram of another smart audio system use scenario 600. More specifically, in the smart audio system use scenario 600, the smart audio system provides a seamless transition to a default speaker based upon audio device battery life. More specifically, the smart audio system of the information handling system 610 monitors the battery life of a connected audio device 612. When the smart audio system determines that the battery life of the connected audio device 512 is less than a particular threshold, the smart audio system notifies a user to switch away from the audio device. In certain embodiments, a smart audio system user interface 620*a* provides the notification to the user.

In certain embodiments, when the battery of one or more audio devices is recharged, a notification may be provided to the user via the smart audio system user interface 620*b*. In certain embodiments, the notification includes a list of other available audio devices to which the user may switch. In certain embodiments, a hotkey may be used to reconnect to the recharged audio device and make this device active. In certain embodiments, the smart audio system obtains battery information from the selected audio device. In certain embodiments, the battery information of the available audio devices may also be presented via the smart audio system user interface.

Figure 7:
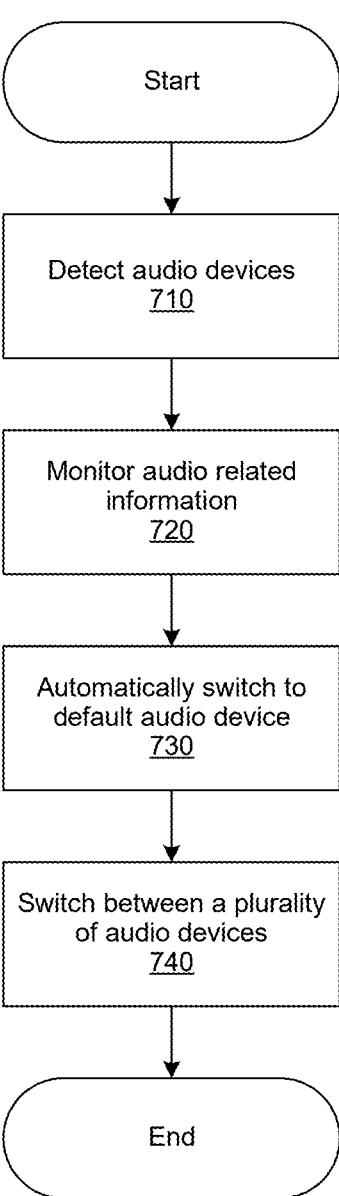
FIG. 7 shows a flow chart of a smart audio system operation.

FIG. 7 shows a flow chart of a smart audio system operation 700. More specifically, the smart audio system operation 700 starts as step 710 by detecting all audio devices that are available for communication with an information handling system. In certain embodiments, the available audio devices can include integrated audio devices, Bluetooth connected audio devices, wire connected audio devices, other audio devices, or a combination thereof.

Next at step 720, the smart audio system monitors the information handling system audio related information. As used herein, information handling system audio related information broadly refers to information associated with one or more audio devices. In certain embodiments, the information associated with the one or more audio devices can include information to manage the one or more audio devices, audio source information for provision via the one or more audio devices, or a combination thereof. In certain embodiments, the audio related information includes one or more of audio status information, usage information, user input information, location information associated with the information handling system, the one or more audio devices, or a combination thereof, meeting attendance information of a user of the information handing system and battery status of some or all of the detected audio devices. In certain embodiments, the status information can include determining when an audio device is connected or disconnected with the information handling system. In certain embodiments, the status information can include connection frequency (i.e., how often or when an audio device is connected or disconnected) with the information handling system. In certain embodiments, the meeting attendance information can be used to provide options to the user to switch between the audio devices when attending a meeting. In certain embodiments, the options to switch audio devices may be provided by instructing the user inputs through volume buttons (e.g., actuate the volume button thrice to switch to a speaker of a meeting room). In certain embodiments, the status information may be used to determine whether to switch to an integrated speaker. In certain embodiments, switching to the integrated speaker may be to prevent data loss. In certain embodiments, switching to the integrated speaker may be switching to the integrated speakers from a connected Bluetooth audio device if the connected Bluetooth audio device has been idle for longer than a predetermined amount of time. In certain embodiments, the status information includes audio device battery information. With wireless speakers or headsets the smart audio system monitors battery levels and can generate a warning message when a battery level of the device is below a predetermined threshold. In certain embodiments, the battery information can be used to allow for seamless transition to enable a default audio device such as an integrated audio device. In certain embodiments, the status information includes user inputs. In certain embodiments, the user input can include a volume up operation, a volume down operation, a long volume up operation, etc.

Next at step 730, the smart audio system automatically switches to a different audio device based upon idle time information, the battery information, or a combination thereof. In certain embodiments, the idle time information can include a user set idle time threshold. In certain embodiments, the battery information is fetched from active audio devices that are not functioning in an idle mode of operation. In certain embodiments, if a particular audio device idle time exceeds a particular threshold (e.g., 5 minutes), the smart audio system pushes a notification to switch to a default speaker from the particular audio device. In certain embodiments, battery level thresholds may be user configurable. In certain embodiments, the battery level thresholds include a low battery threshold (e.g., below 15%) and an upper battery threshold (e.g., above 60%). In certain embodiments, when the battery level is below the low battery threshold, the smart audio system switches to the default audio device (e.g., the integrated speaker). In certain embodiments, when the smart audio system determines that a battery level of a connected audio device exceeds the upper battery threshold, the smart audio system presents the user with an option of switching back to that audio device. In certain embodiments, the option of switching back to the audio device may be selected by actuating a hotkey on the audio device (e.g., by multiple presses of a volume button of the audio device).

Next, at step 740, the smart audio system seamlessly switches between different connected audio devices based upon user selection, user location, or a combination thereof. In certain embodiments, the seamless switching includes audio buffering, codec optimization, or a combination thereof. In certain embodiments, the smart audio system monitors audio devices in real time. In certain embodiments, the smart audio system periodically checks for changes in a list of available audio devices. In certain embodiments, the smart audio system determines when new audio devices become available, when devices are removed, or a combination thereof. In certain embodiments, the smart audio system includes cross audio platform compatibility. In certain embodiments, the smart audio system functions across a plurality of operating systems. In certain embodiments, the smart audio system provides automatic audio device selection upon activation of a particular conferencing application. In certain embodiments, the automatic audio device selection for a particular conferencing application is user configurable.

Figure 8:
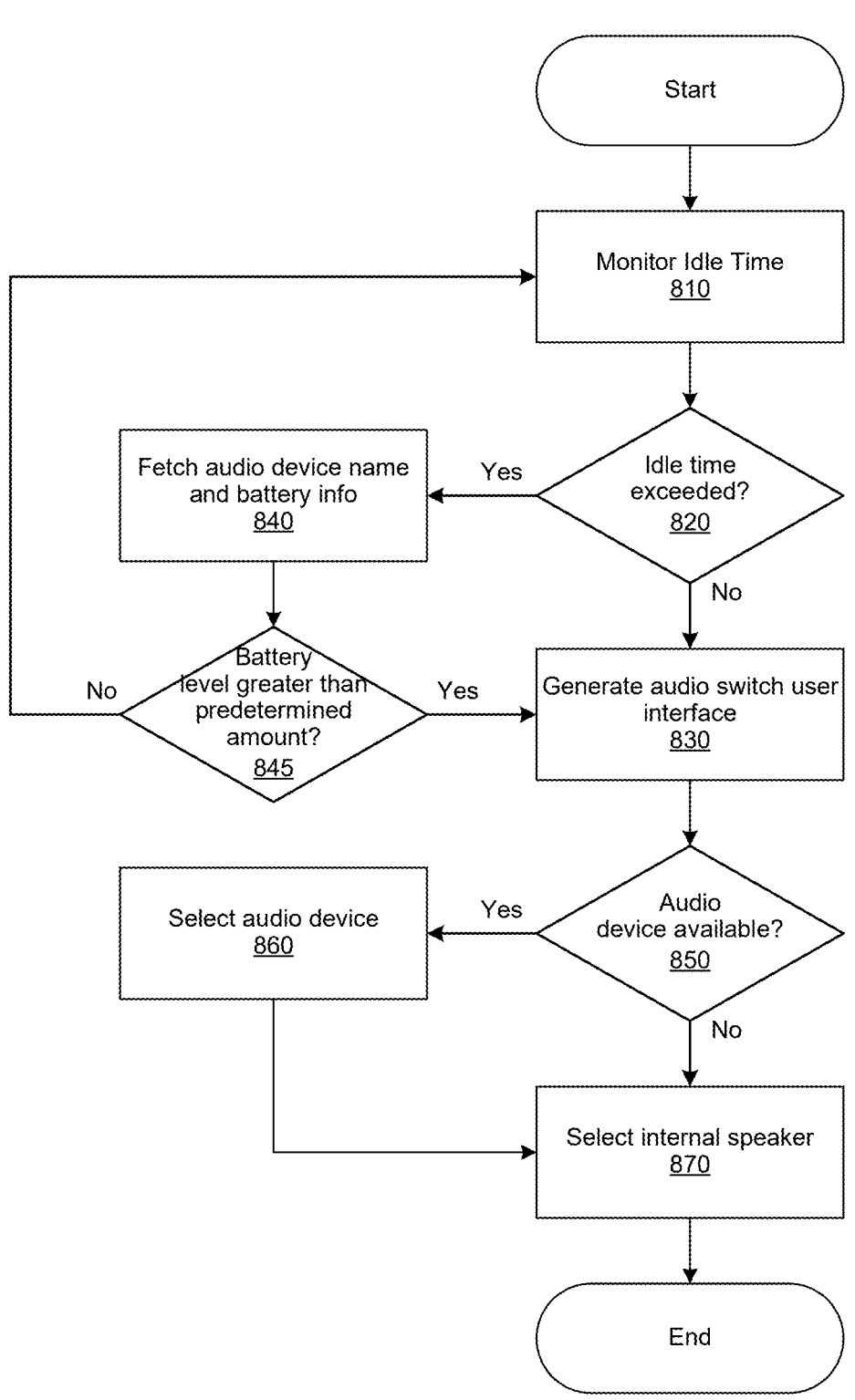
FIG. 8 shows a flow chart of a smart audio system battery level detection operation.

FIG. 8 shows a flow chart of a smart audio system battery level detection operation 800. In certain embodiments, a smart audio system operation includes the smart audio system battery level detection operation 800.

More specifically, the smart audio system battery level detection operation 800 starts at step 810 by monitoring the idle time of the audio device. In certain embodiments, the audio device being monitored includes a wirelessly connected audio device. Next at step 820, the smart audio system battery level detection operation 800 determines whether the idle time has not exceeded a predetermined amount of time (e.g., the idle time is less than 5 minutes). If the idle time has exceeded a predetermined amount of time, then the smart audio system battery level detection operation 800 proceeds to step 830 during which the smart audio system generates an audio switch user interface to enable a user to select a next best audio device.

If the idle time has not exceeded a predetermined amount of time, then the smart audio system battery level detection operation 800 proceeds to step 840 during which the smart audio system communicates with the audio device to obtain the audio device name and battery information. Next at step 845, the smart audio system battery level detection operation 800 determines whether the battery level of the selected audio device is less than a predetermined battery level (e.g., the battery level is less than 15 percent). If the battery level is greater than the predetermined battery level, then the smart audio system battery level detection operation 800 proceeds to step 830 during which the smart audio system generates an audio switch user interface to enable a user to select a next best audio device. If the battery level is less than the predetermined battery level, then the smart audio system battery level detection operation 800 proceeds to step 810 during which the smart audio system monitors the idle time of the audio device.

After the user selects a next best audio device at step 830, the smart audio system battery level detection operation 800 proceeds to step 850 during which the smart audio system battery level detection operation 800 determines whether the next best audio device is available. If the next best audio device is available, then the smart audio system selects that audio device at step 860 and the smart audio system battery level detection operation 800 ends. If the next best audio device is not available, then the smart audio system selects the built-in audio device at step 870 and the smart audio system battery level detection operation 800 ends.

Figure 9:
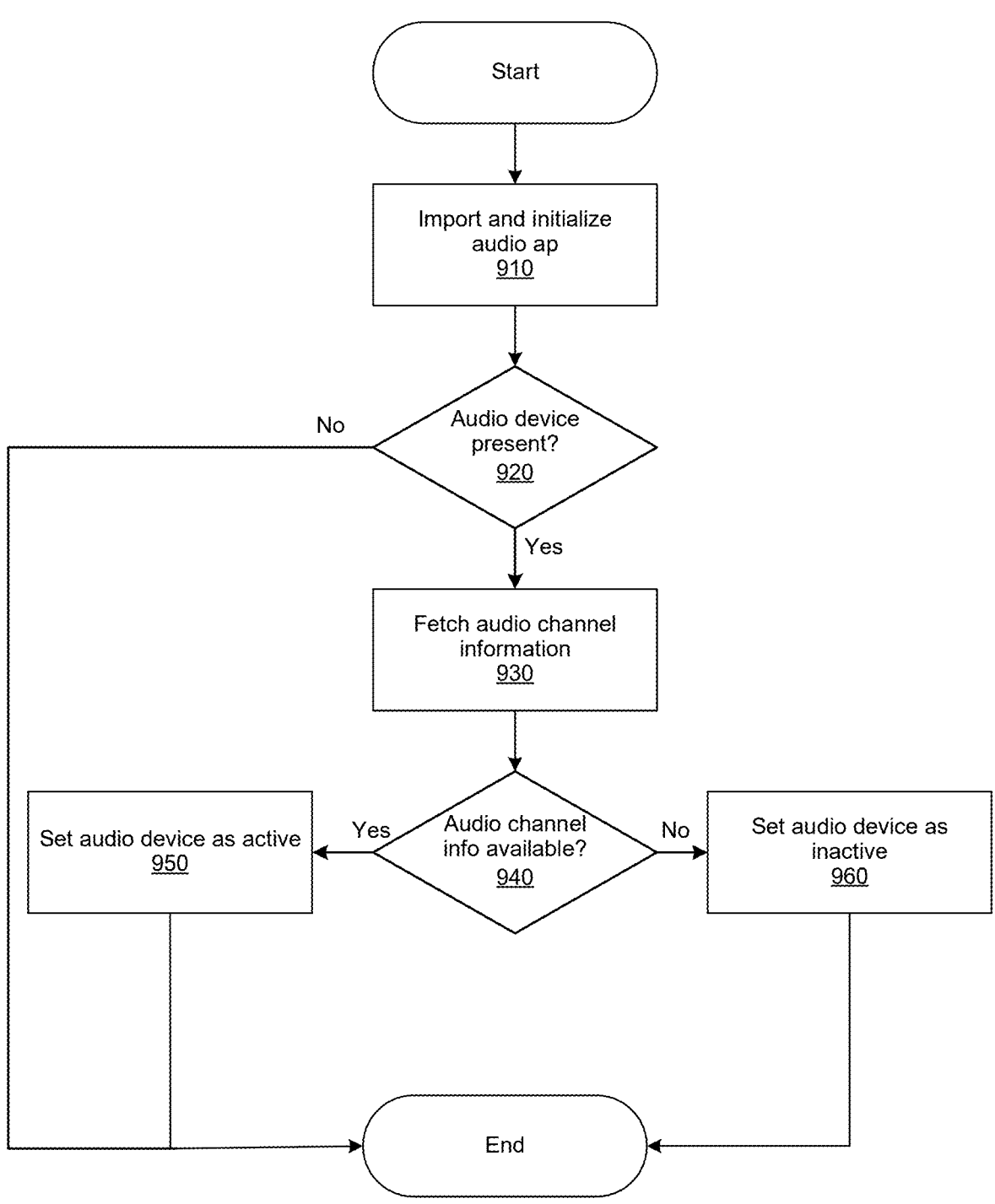
FIG. 9 shows a flow chart of smart audio system active device detection operation.

FIG. 9 shows a flow chart of a smart audio system active device detection operation 900. In certain embodiments, a smart audio system operation includes the smart audio system active device detection operation 900.

More specifically, the smart audio system active device detection operation 900 starts at step 910 by importing and initializing an audio playback application. In certain embodiments, the audio playback application corresponds to a PortAudio audio application library. Next at step 920 the smart audio system active device detection operation 900 determines whether there are audio devices associated with the information handling system on which the smart audio system active device detection operation 900 is executing. In certain embodiments, the determination is made by determining that the number of audio devices is greater than zero.

If there are no audio devices associated with the information handling system, then the smart audio system active device detection operation 900 completes operation.

When there is at least one audio device associated with the information handling system, then the smart audio system active device detection operation 900 fetches audio channel information at step 930. In certain embodiments, the audio channel information includes a maximum input channel indicia (MaxInputChannel), a maximum output channel indicia (MaxOutputChannel), or a combination thereof. In certain embodiments, the maximum input channel indicia and the maximum output channel indicia may be combined to provide a maximum input/output channel indicia (MaxIOChannel). Next at step 940, the smart audio system active device detection operation 900 determines whether the maximum input/output channel indicia is greater than zero. In certain embodiments, a maximum input/output channel indicia greater than zero indicates that audio channel information is available.

When the maximum input/output channel indicia is greater than zero, then the audio device associated with each input/output channel indicia is set to active at step 850, thus indicating the presence of the audio device. When the maximum input/output channel indicia is zero, then the audio device associated with the input/output channel indicia is set to inactive at step 860, thus indicating that the audio device is not active. After the audio device is set to active at step 850 or inactive at step 860, the smart audio system active device detection operation 900 completes operation.

Figure 10:
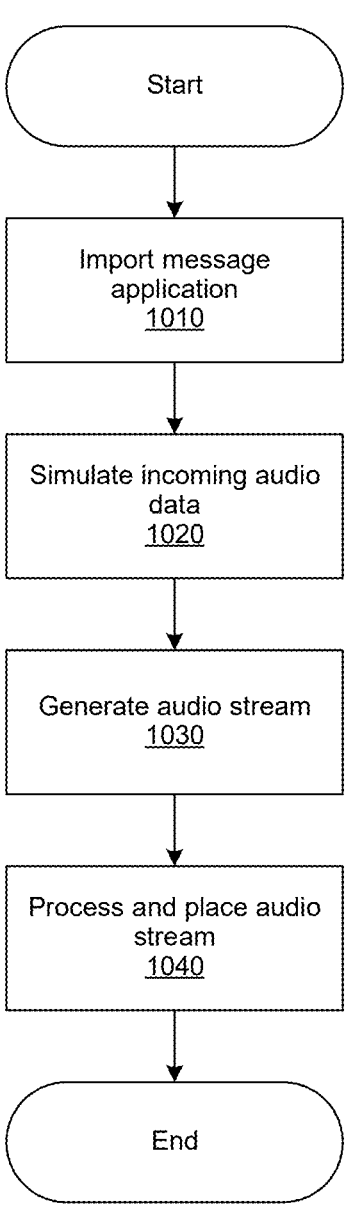
FIG. 10 shows a flow chart of a smart audio system audio quality management operation.

FIG. 10 shows a flow chart of a smart audio system audio quality management operation 1000. In certain embodiments, a smart audio system operation includes the smart audio system audio quality management operation 1000. More specifically, the smart audio system audio quality management operation 1000 starts at step 1010 by importing a message application for use in generating smart audio notifications. In certain embodiments, the message application includes a widget toolkit such as the tkinter user interface toolkit application. Next at step 1020 the smart audio system audio quality management operation 1000 simulates incoming audio data using a preset sound file. Next at step 1030 the smart audio system audio quality management operation 1000 generates an audio stream using the sound file. In certain embodiments, the audio stream corresponds to a PyAudio type audio stream. In certain embodiments, the PyAudio type audio stream is configured to execute on an audio playback application such as the PortAudio audio application. Next at step 1040 the smart audio system audio quality management operation 1000 processes and plays the audio stream.

Figure 11:
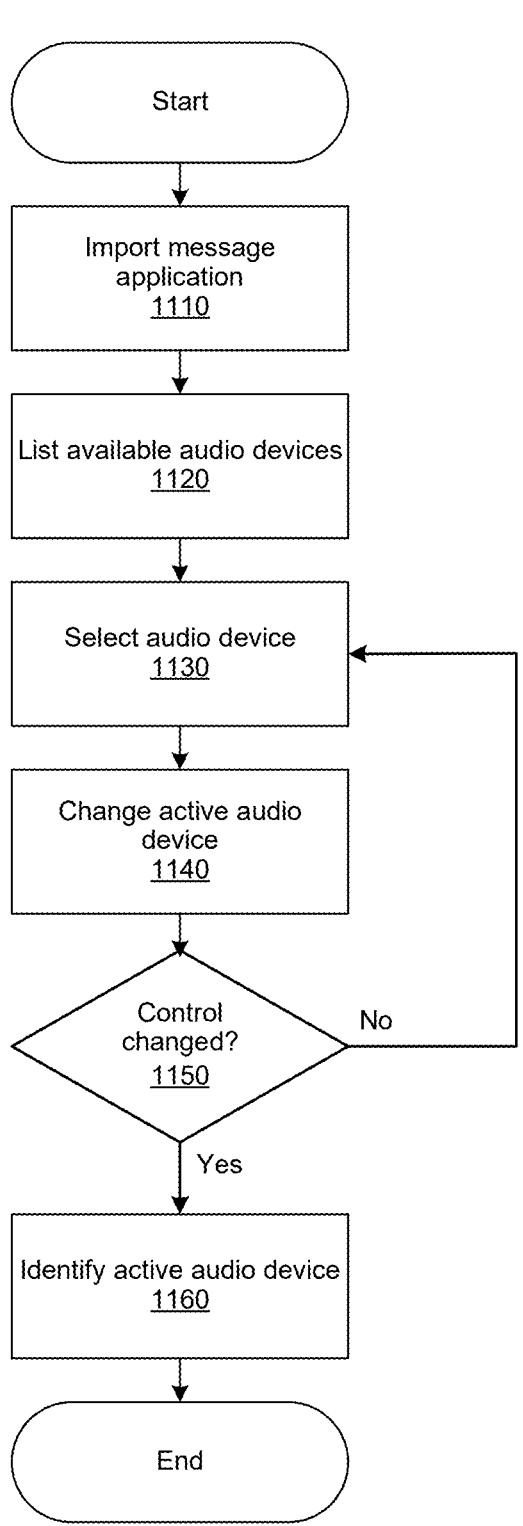
FIG. 11 shows a flow chart of a smart audio system automatic audio device change operation.

FIG. 11 shows a flow chart of a smart audio system automatic audio device change operation 1100. In certain embodiments, a smart audio system operation includes the smart audio system automatic audio device change operation 1100.

More specifically, the smart audio system automatic audio device change operation 1100 starts at step 1110 by importing a message application for use in generating smart audio notification. In certain embodiments, the message application includes a widget toolkit such as the tkinter user interface toolkit application.

Next at step 1120, the smart audio system automatic audio device change operation 1100 uses the message application and an audio playback application to list available audio devices. In certain embodiments, the audio playback application corresponds to a PortAudio audio application library. Next at step 1130, the smart audio system automatic audio device change operation 1100 uses the message application to allow a user to select an audio device from the list of available audio devices.

Next at step 1140, the smart audio system automatic audio device change operation 1100 attempts to change the active audio device. Next at step 1150, the smart audio system automatic audio device change operation 1100 checks the audio playback application that control of the audio device has changed to the identified device audio device. If so, then the smart audio system automatic audio device change operation 1100 uses the message application to generate a notification to this effect at step 1160 and the smart audio system automatic audio device change operation 1100 completes operation. If not, then the smart audio system automatic audio device change operation 1100 returns to step 1130 to allow a user to select another audio device from the list of available audio devices.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a smart audio operation, comprising:
   detecting a plurality of audio devices available for use by an information handling system;
   monitoring information handling system audio related information;
   analyzing the information handling system audio related information using a trained smart audio artificial intelligence model; and,
   automatically connecting the information handling system to a particular audio device of the plurality of audio devices based upon the information handling system audio related information.

2. The method of claim 1, wherein:
   the plurality of audio devices includes at least two of an integrated audio device, a wireless audio device, and a wire connected audio device.

3. The method of claim 1, wherein:
   the information handling system audio related information includes one or more of audio status information, usage information, user input information, location information associated with the information handling system, the audio devices, meeting attendance information of a user of the information handing system and battery status of some or all of the detected audio devices.

4. The method of claim 1, wherein:
the automatically connecting switches from a wireless audio device to a default audio device based upon an idle time of the wireless audio device.

5. The method of claim 1, wherein:
the automatically connecting switches from a wireless audio device to a default audio device based upon battery level of the wireless audio device.

6. The method of claim 1, wherein:
the automatically connecting switches to a particular audio device based upon meeting attendance information of a user of the information handling system.

7. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
    detecting a plurality of audio devices available for use by an information handling system;
    monitoring information handling system audio related information;
    analyzing the information handling system audio related information using a trained smart audio artificial intelligence model; and,
    automatically connecting the information handling system to a particular audio device of the plurality of audio devices based upon the information handling system audio related information.

8. The system of claim 7, wherein:
the plurality of audio devices includes at least two of an integrated audio device, a wireless audio device, and a wire connected audio device.

9. The system of claim 7, wherein:
the information handling system audio related information includes one or more of audio status information, usage information, user input information, location information associated with the information handling system, the audio devices, meeting attendance information of a user of the information handing system and battery status of some or all of the detected audio devices.

10. The system of claim 7, wherein:
the automatically connecting switches from a wireless audio device to a default audio device based upon an idle time of the wireless audio device.

11. The system of claim 7, wherein:
the automatically connecting switches from a wireless audio device to a default audio device based upon battery level of the wireless audio device.

12. The system of claim 7, wherein:
the automatically connecting switches to a particular audio device based upon meeting attendance information of a user of the information handling system.

13. A non-transitory, computer-readable storage medium embodying computer program code, the computer program code comprising computer executable instructions configured for:
    detecting a plurality of audio devices available for use by an information handling system;
    monitoring information handling system audio related information;
    analyzing the information handling system audio related information using a trained smart audio artificial intelligence model; and,
    automatically connecting the information handling system to a particular audio device of the plurality of audio devices based upon the information handling system audio related information.

14. The non-transitory, computer-readable storage medium of claim 13, wherein:
the plurality of audio devices includes at least two of an integrated audio device, a wireless audio device, and a wire connected audio device.

15. The non-transitory, computer-readable storage medium of claim 13, wherein:
the information handling system audio related information includes one or more of audio status information, usage information, user input information, location information associated with the information handling system, the audio devices, meeting attendance information of a user of the information handing system and battery status of some or all of the detected audio devices.

16. The non-transitory, computer-readable storage medium of claim 13, wherein:
the automatically connecting switches from a wireless audio device to a default audio device based upon an idle time of the wireless audio device.

17. The non-transitory, computer-readable storage medium of claim 13, wherein:
the automatically connecting switches from a wireless audio device to a default audio device based upon battery level of the wireless audio device.

18. The non-transitory, computer-readable storage medium of claim 13, wherein:
the automatically connecting switches to a particular audio device based upon meeting attendance information of a user of the information handling system.

19. The non-transitory, computer-readable storage medium of claim 13, wherein:
the computer executable instructions are deployable to a client system from a server system at a remote location.

20. The non-transitory, computer-readable storage medium of claim 13, wherein:
the computer executable instructions are provided by a service provider to a user on an on-demand basis.

* * * * *